(12) United States Patent
Wen et al.

(10) Patent No.: US 6,966,568 B2
(45) Date of Patent: Nov. 22, 2005

(54) MULTI-FUNCTION BRACKET FOR AN AIR SUSPENSION

(75) Inventors: Xinyu Wen, Auburn Hills, MI (US); David K. Platner, Shelby, MI (US); Benjamin R. Reineck, Waterford, MI (US); Kou Yang, Sterling Heights, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 87 days.

(21) Appl. No.: 10/365,000

(22) Filed: Feb. 12, 2003

(65) Prior Publication Data

US 2004/0155426 A1    Aug. 12, 2004

(51) Int. Cl.[7] .............................................. B60G 11/46
(52) U.S. Cl. ................. 280/124.175; 267/52
(58) Field of Search .................... 280/124.17, 124.175, 280/124.163; 267/31, 52, 51, 32, 38, 241, 267/243

(56) References Cited

U.S. PATENT DOCUMENTS

| | | | |
|---|---|---|---|
| 2,874,956 A * | 2/1959 | La Belle ...................... | 267/31 |
| 3,285,621 A | 11/1966 | Turner | |
| 3,617,072 A | 11/1971 | Turner | |
| 3,730,549 A | 5/1973 | Turner | |
| 3,730,550 A | 5/1973 | Thaxton | |
| 3,877,718 A | 4/1975 | Scanlon | |
| 4,000,913 A | 1/1977 | Gibson | |
| 4,923,210 A | 5/1990 | Heider | |
| 5,335,932 A | 8/1994 | Pierce | |
| 5,354,091 A * | 10/1994 | Baxter et al. .................. | 267/52 |
| 5,470,096 A * | 11/1995 | Baxter .................... | 280/124.17 |
| 5,560,641 A | 10/1996 | Vogler | |
| 5,950,971 A | 9/1999 | Koumbis et al. | |
| 6,213,507 B1 | 4/2001 | Ramsey et al. | |
| 6,234,502 B1 | 5/2001 | Sobina | |
| 6,250,613 B1 | 6/2001 | Koeske et al. | |
| 6,394,474 B1 | 5/2002 | Warinner et al. | |
| 6,428,027 B1 * | 8/2002 | Stuart .................. | 280/124.175 |
| 2003/0030236 A1 | 2/2003 | Glass | |

FOREIGN PATENT DOCUMENTS

| | | |
|---|---|---|
| GB | 2 141 677 A | 1/1985 |
| WO | WO 01/83243 A1 | 11/2001 |

OTHER PUBLICATIONS

European Search Report, dated Sep. 10, 2004.

* cited by examiner

Primary Examiner—David R. Dunn
Assistant Examiner—Joselynn Y. Sliteris
(74) Attorney, Agent, or Firm—Carlson, Gaskey & Olds

(57) ABSTRACT

A suspension system includes a primary structural support such as an axle beam. To dampen movement of the beam, a leaf spring is attached to longitudinal mainframes which extend parallel to a vehicle centerline. A bracket assembly attaches the beam to the leaf springs by sandwiching the leaf spring therebetween. The bracket assembly also provides a support and mount for an air bag and a shock.

23 Claims, 8 Drawing Sheets

MULTI-FUNCTION BRACKET FOR AN AIR SUSPENSION

BACKGROUND OF THE INVENTION

The present invention relates to an air suspension, and more particularly to a bracket assembly for mounting an air spring to a leaf spring.

Various air-ride beam-type suspension arrangements are known. Conventional suspensions include a pair of longitudinally extending flexible members such as leaf springs. Each flexible member is located adjacent a longitudinal vehicle frame rail underneath the body of a truck or trailer chassis. An axle beam is secured to each flexible member through a bracket assembly which engages the flexible member and is clamped to the axle beam with a pair of U-bolts.

The bracket assembly is often rather complex as it may further include multiple top seats, bottom caps and attaching nuts which interface with the various components. Moreover, the bracket assembly must be structurally strong to support the various components which interact therethrough. The weight of the bracket is in addition to the weight of the axle beam which may require a relatively complex geometry to support an air bag, a shock absorber and a specific clamping arrangement for the bracket assembly and U-bolts.

Accordingly, it is desirable to provide a bracket assembly having an uncomplicated attachment arrangement which accommodates various suspension members, includes attachment points for multiple components, yet is light in weight.

SUMMARY OF THE INVENTION

The suspension system according to the present invention includes a primary structural support such as an axle beam. To dampen movement of the beam, a flexible member such as a leaf spring is attached to longitudinal mainframes which extend parallel to a vehicle centerline.

A bracket assembly attaches the beam to the leaf springs. The bracket assembly is attached to the beam through U-bolts and lower clamp plates to sandwich the leaf spring therebetween. The bracket assembly further provides a support and mount for an air bag and a shock. That is, the bracket assembly provides for a single integral mount for a multiple of suspension components. Moreover, as the bracket assembly interconnects the leaf spring and beam members while supporting other suspension components, the beam may be a relatively lightweight and uncomplicated member.

The bracket assembly includes an air spring seat and a mount. The air spring seat includes a U-shaped portion mounted to an air spring plate through welding or the like. The mount fits at least partially within the U-shaped portion and includes arcuate grooves to receive U-bolts. Openings within the U-shaped portion provide passage for a U-bolt to sandwich the mount to the air spring seat. A rigid bracket assembly is therefore provided due to interaction of the bolts, the mount, and the seat.

Another air spring seat includes a single step shaped member having an air spring seat area and an extended mount area. The extended mount area includes a plurality of apertures which directly receive U-bolts which extend around an axle beam to sandwich the leaf spring therebetween.

Another air spring seat includes a single stepped shaped member having an air spring seat area, an extended mount area, and a mounting plate which engages the extended mount area such that apertures need not be formed therethrough.

The present invention therefore provides a bracket assembly having an uncomplicated attachment arrangement which accommodates various suspension members, includes attachment points for multiple components, yet is light in weight.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
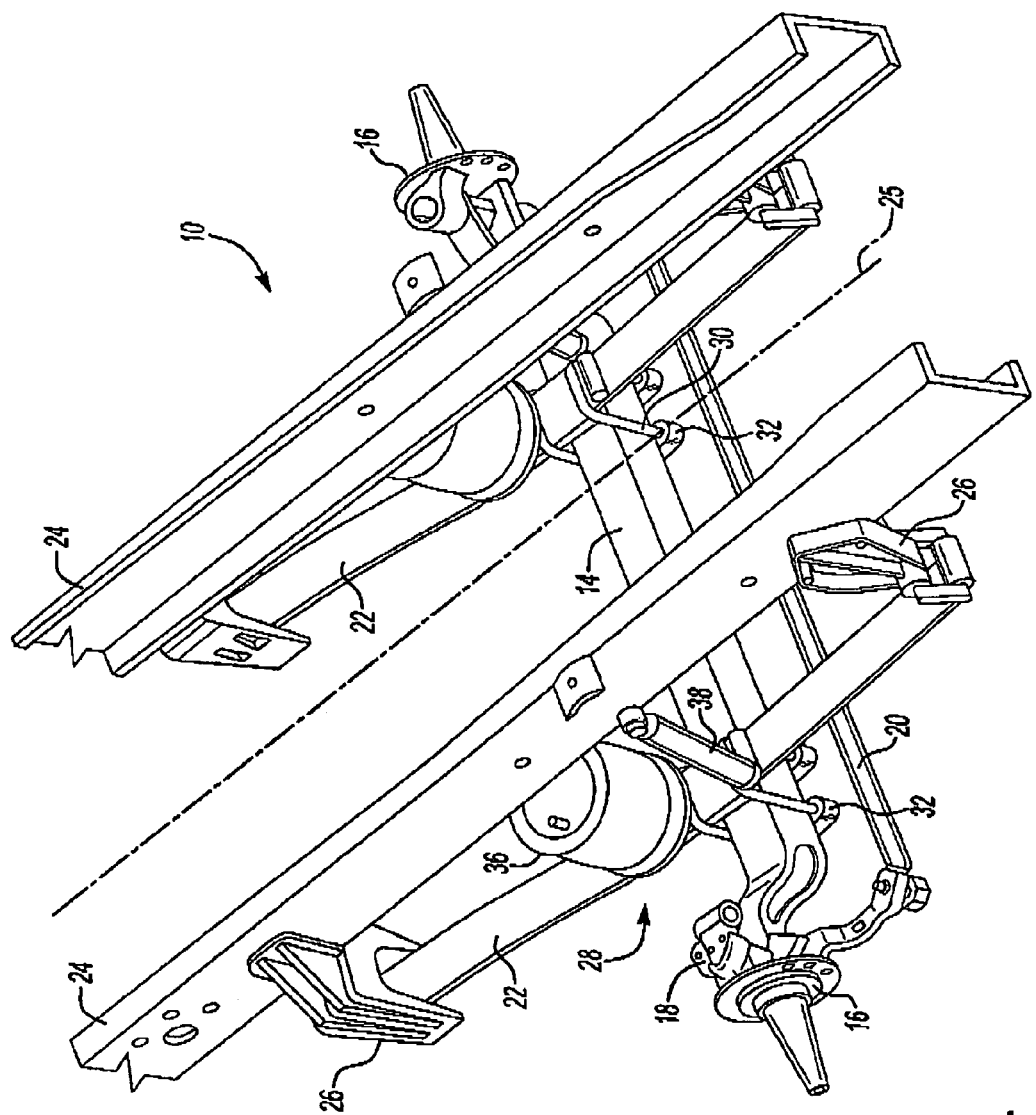
FIG. 1 is a general top perspective view of a suspension system for use with the present invention.

FIG. 1 illustrates a general perspective view of a steerable air spring suspension system 10. Although a steerable suspension is disclosed in the illustrated embodiment, it should be understood that other suspensions will benefit from the present invention.

The system 10 generally includes a primary structural support such as an axle beam 14. The beam 14 is preferably a single hollow square beam located transverse to a vehicle longitudinal axis 15. A pair of steerable hub assemblies 16 are pivotally supported by the beam 14. A king pin 18 or the like pivotally attaches the steerable hub assembly 16 to the beam 14 in a known manner. The steerable hub assemblies 16 are articulatable through the use of steering gear (not shown) and are linked together by a linkage 20.

To dampen movement of the beam 14, a flexible member such as a leaf spring 22 is attached to longitudinal mainframes 24 which extend parallel to a vehicle centerline 25. The leaf springs 22 are typically attached to the mainframes 24 through a hanger and shackle assembly 26 or the like. It should be understood that various component mounting arrangements will benefit from the present invention.

A bracket assembly 28 attaches the beam 14 to each leaf springs 22. The bracket assembly 28 is preferably attached to the beam 14 through U-bolts 30 and lower clamp plates 32 to sandwich the leaf spring 22 therebetween. The U-bolts 30 pass over the beam 14 and are retained in the lower clamp plates through fasteners 34 (also illustrated in FIG. 2). The bracket assembly 28 further provides a support and mount for an air bag 36 and a shock 38 (also illustrated in FIG. 3). That is, the bracket assembly 28 provide for a single integral mount for a multiple of suspension components. Moreover, as the bracket assembly 28 interconnects the leaf spring and beam members while supporting other suspension components, the beam 14 maybe a relatively lightweight and uncomplicated member.

Figure 4:
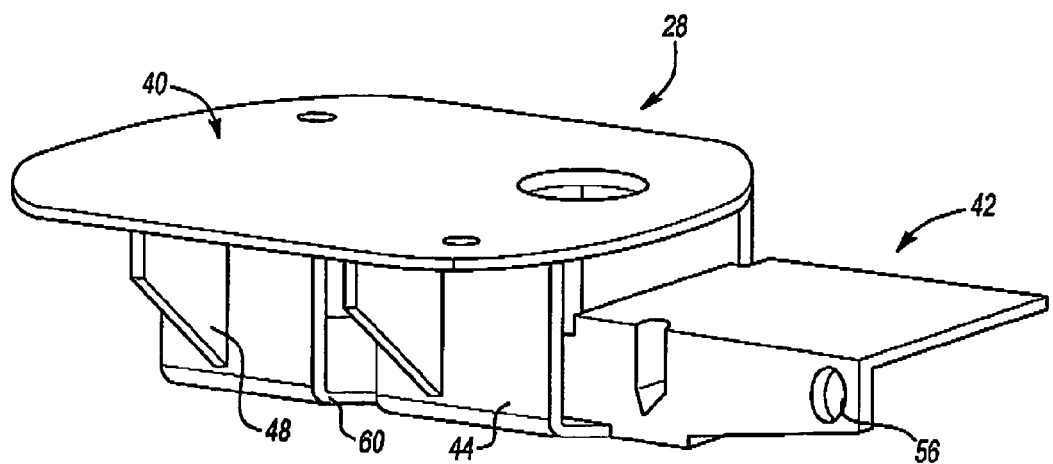
FIG. 4 is a general perspective view of bracket assembly of the present invention.
Figure 5:
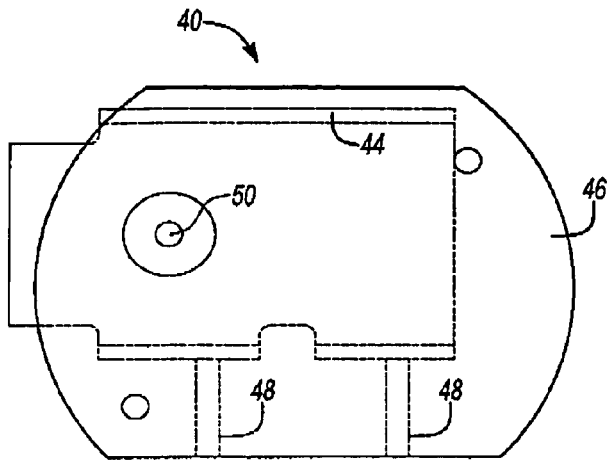
FIG. 5 is a top view of a spring seat portion of the bracket assembly of FIG. 4.
Figure 6:
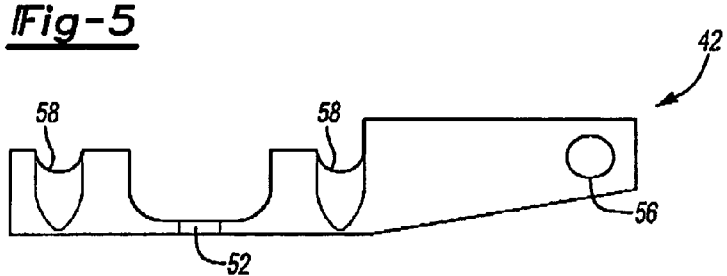
FIG. 6 is a side view of a mount portion of the bracket assembly of FIG. 4.
Figure 7A:
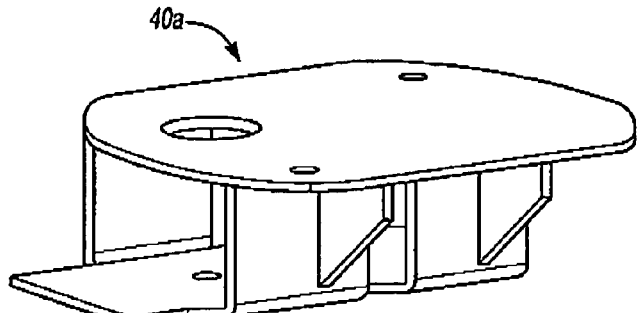
FIG. 7A is a perspective view of a right spring seat portion of the bracket assembly of FIG. 4.
Figure 7B:
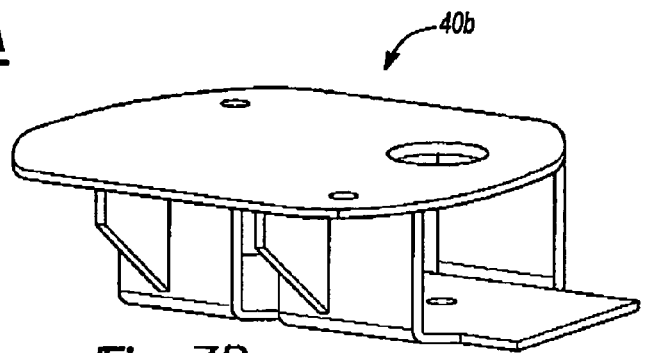
FIG. 7B is a perspective view of a left spring seat portion of the bracket assembly of FIG. 4.

Referring to FIG. 4, the bracket assembly 28 includes an air spring seat 40 (FIG. 5) and a mount 42 (FIG. 6). The seat 40 preferably includes a U-shaped portion 44 mounted to an air spring plate 46 through welding or the like. Gussets 48 provide further support of the plate 46 upon the U-shaped portion 44 to provide for offset mounting of the air bag That is, the mount 42 is common to a Left and Right hand spring seat (40a, 40b; FIGS. 7A, 7B) to offset the air spring from the leaf spring.

Figure 2:
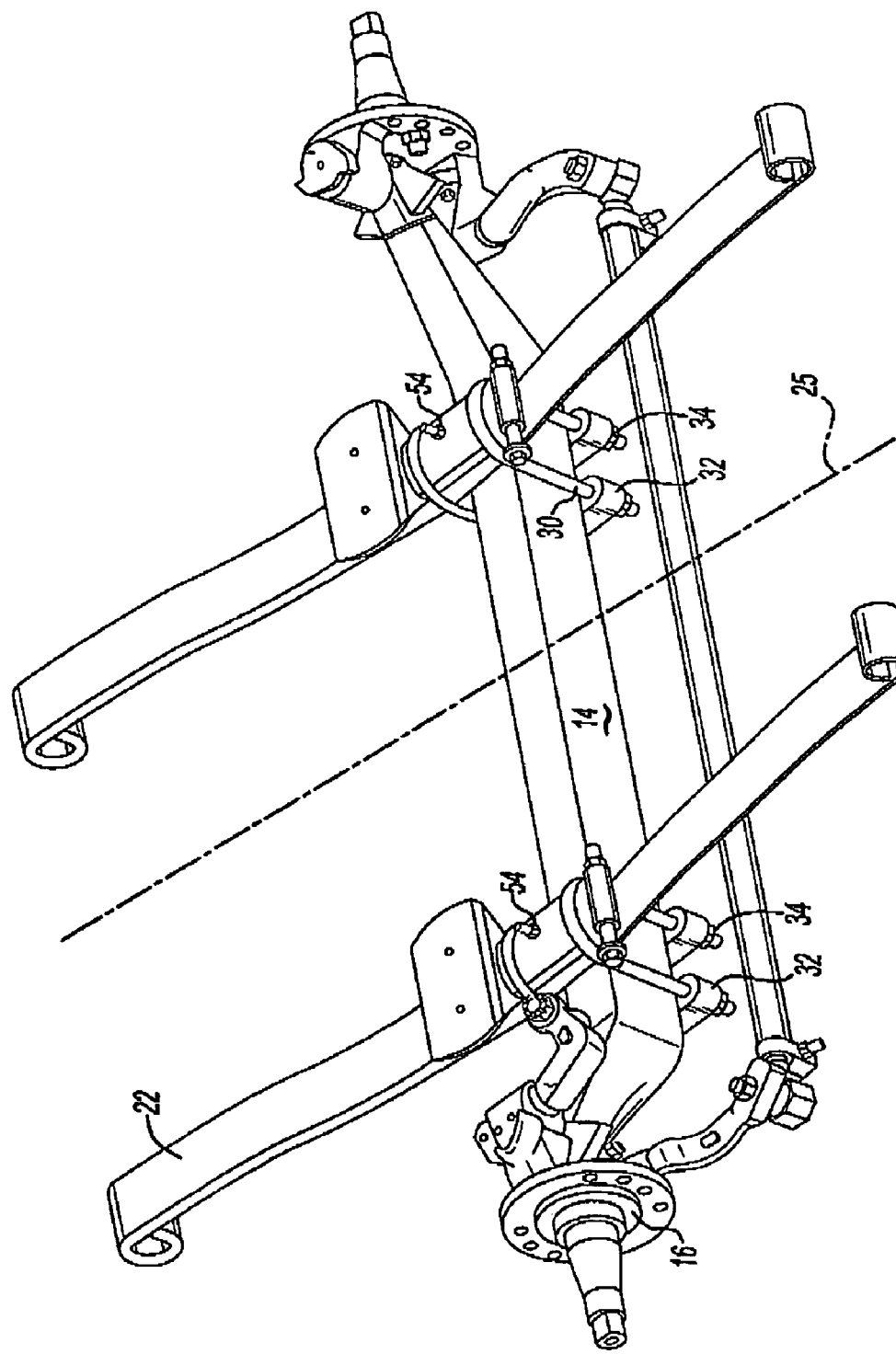
FIG. 2 is a general top perspective view of a suspension system without the air bags mounted to the bracket assembly of the present invention.
Figure 3:
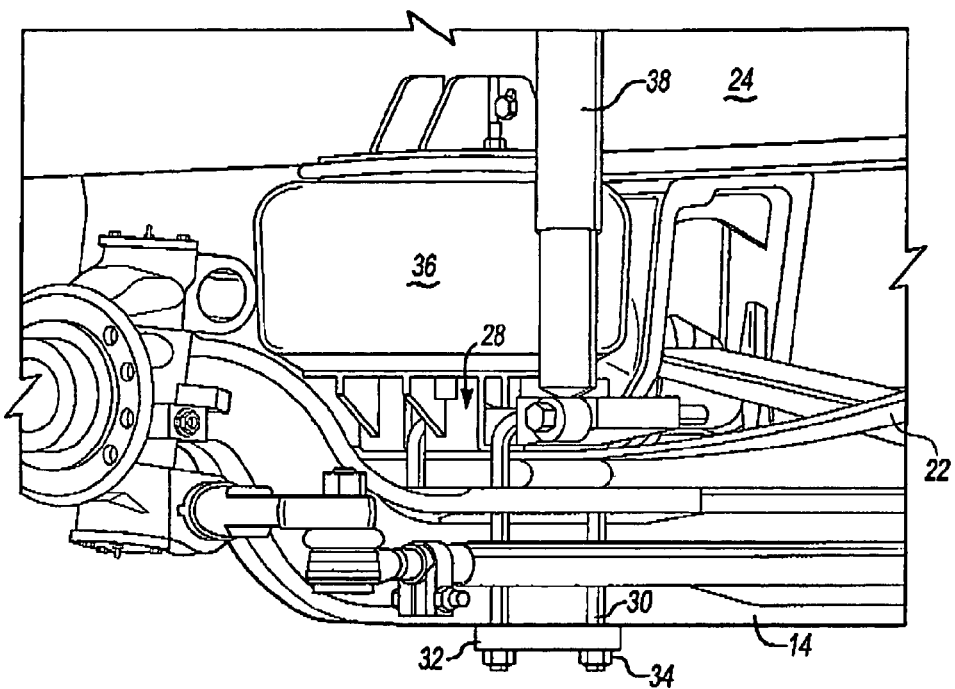
FIG. 3 is a general side perspective view of a suspension system for use with the present invention.

An aperture 50 through portion 44 and an aperture 52 in the mount 42 provides for pre-assembly of either a Left or Right hand bracket assembly through a fastener 54 (FIG. 2). A shock aperture 56 through the mount 42 provides for direct attachment of the shock 38 (FIG. 3). The mount 42 fits at least partially within the U-shaped portion 44 and includes arcuate grooves 58 to receive the U-bolts 30. Preferably, openings 60 within the U-shaped portion 44 provide passage for one U-bolt 30 to sandwich the mount 42 to the seat 40. A rigid bracket assembly is therefore provided due to interaction of the bolts 30, mount 42, and seat 40.

Figure 8A:
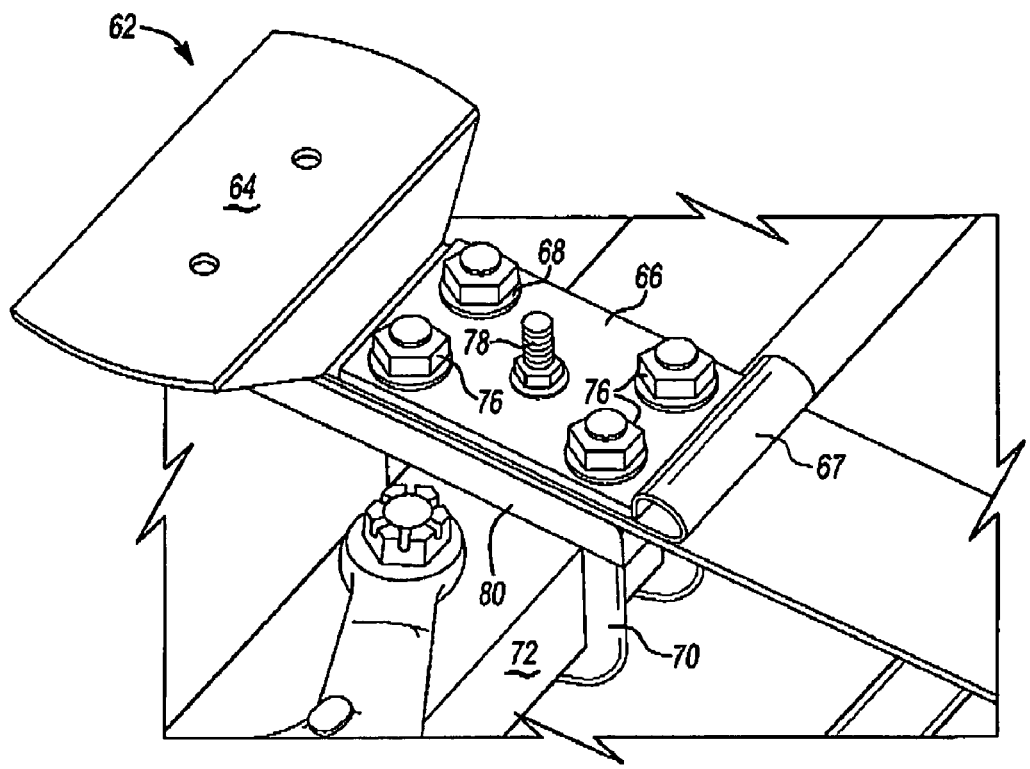
FIG. 8A is a top perspective view of another bracket assembly of the present invention.

Referring to FIG. 8A, another air spring seat 62 includes a single stepped shaped member having an air spring seat area 64 and an extended mount area 66. The air spring seat 62 is preferably formed as a single steel plate. A rolled end 67 of the extended mount area 66 provides for mounting of a shock as described above. The extended mount area 66 includes a plurality of apertures 68 which directly receive U-bolts 70 which extend around an axle beam 72 to sandwich the leaf spring 74 therebetween. The extended mount area 66 provides a surface for fasteners 76 which engage the U-bolts 70. A locating bolt 78 preferably engages the beam 72 and the extended mount area 66 to locate the air spring seat 62 to the beam 72.

Figure 8B:
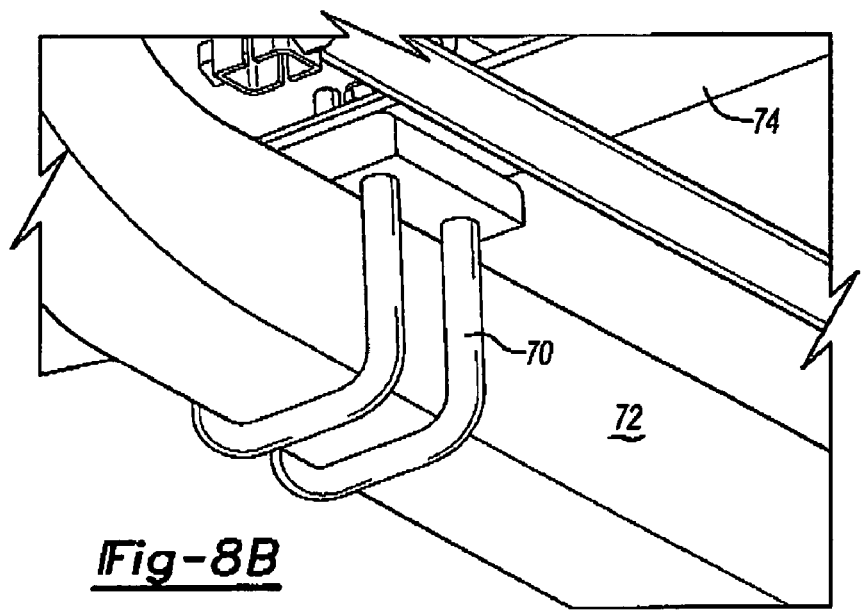
FIG. 8B is a bottom perspective view of the bracket assembly of FIG. 8A.
Figure 9A:
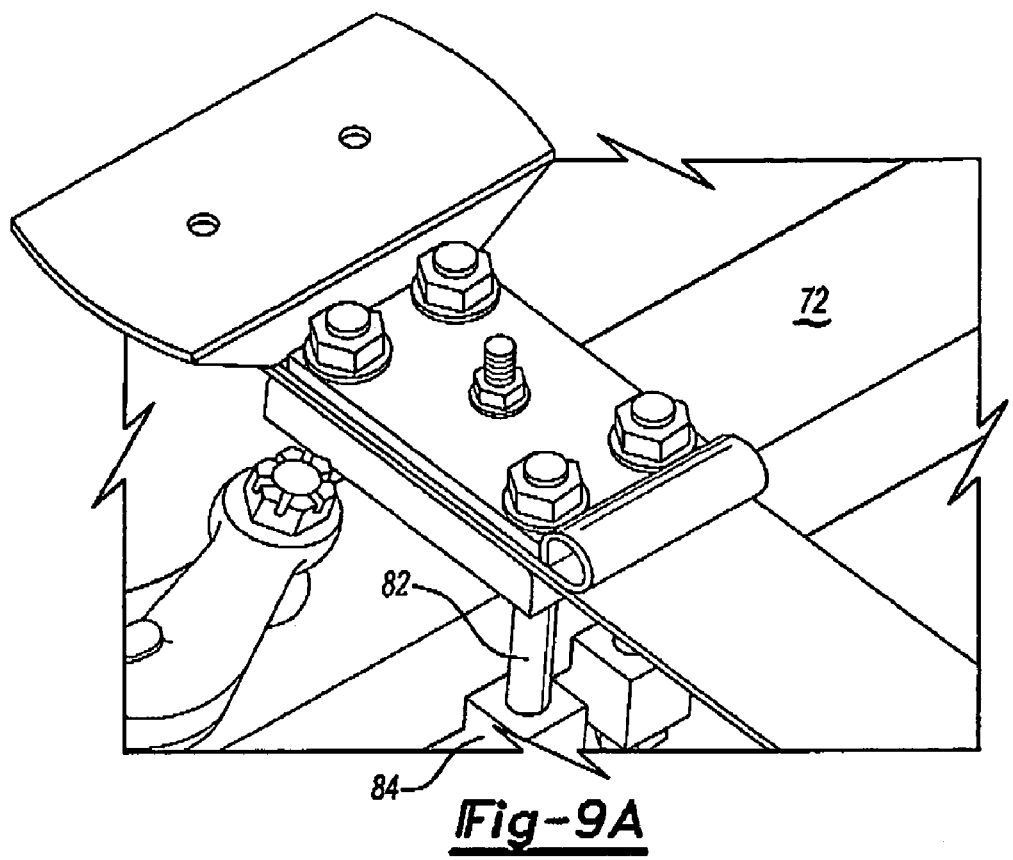
FIG. 9A is a top perspective view of another bracket assembly of the present invention.
Figure 9B:
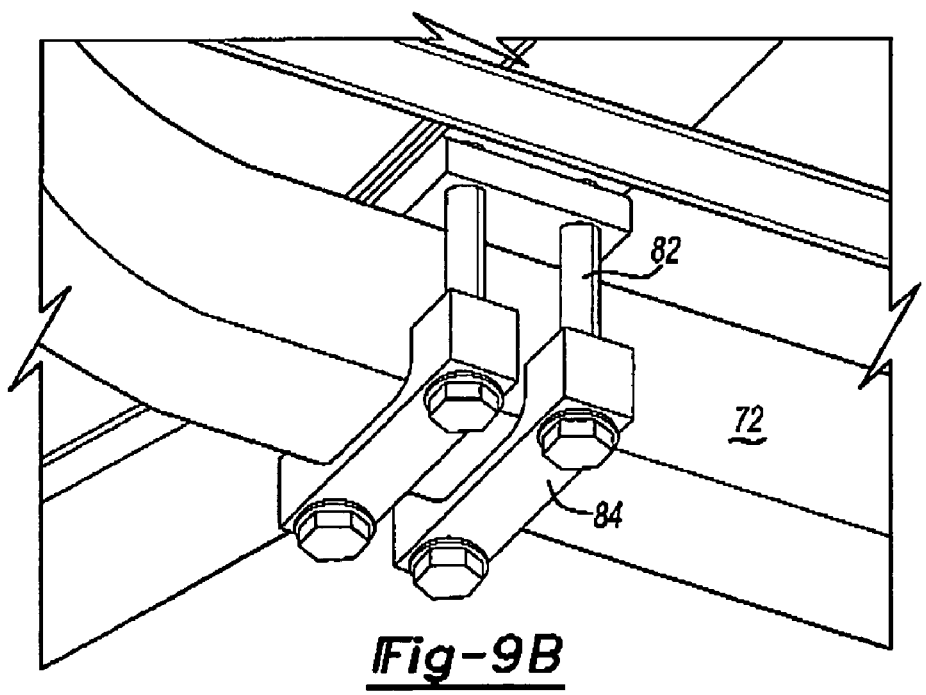
FIG. 9B is a bottom perspective view of the bracket assembly of FIG. 9A.

Referring to FIGS. 9A and 9B, straight bolts 82 and lower clamp plates 84 engage the extended mount area 66 to replace the U-bolts of FIGS. 8A and 8B to provide another mounting arrangement.

Figure 10A:
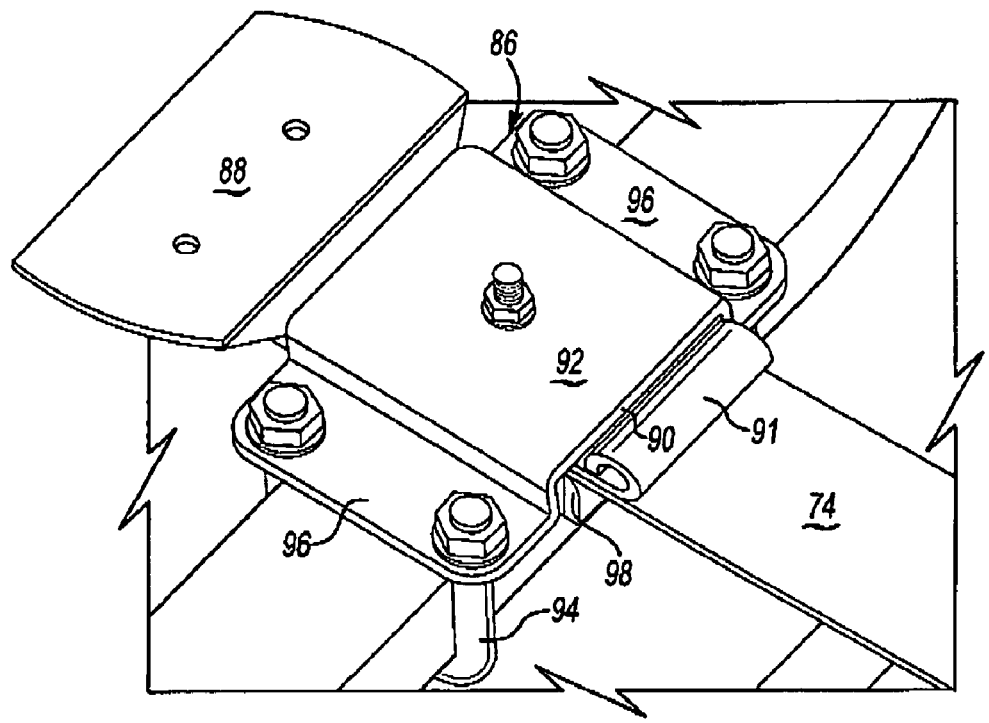
FIG. 10A is a top perspective view of another bracket assembly of the present invention.

Referring to FIG. 10A, another air spring seat 86 includes a single stepped shaped member having an air spring seat area 88 and an extended mount area 90. A mounting plate 92 engages the extended mount area 90 such that apertures need not be formed therethrough for the U-bolts 94. The mounting plate 92 is preferably U-shaped having flanges 96 which contact the beam 72 (FIG. 10B) and provide an engagement surface for fasteners 97 which engage the U-bolts 94. A rolled end 91 of the extended mount area 90 provides mounting location for a shock.

Figure 10B:
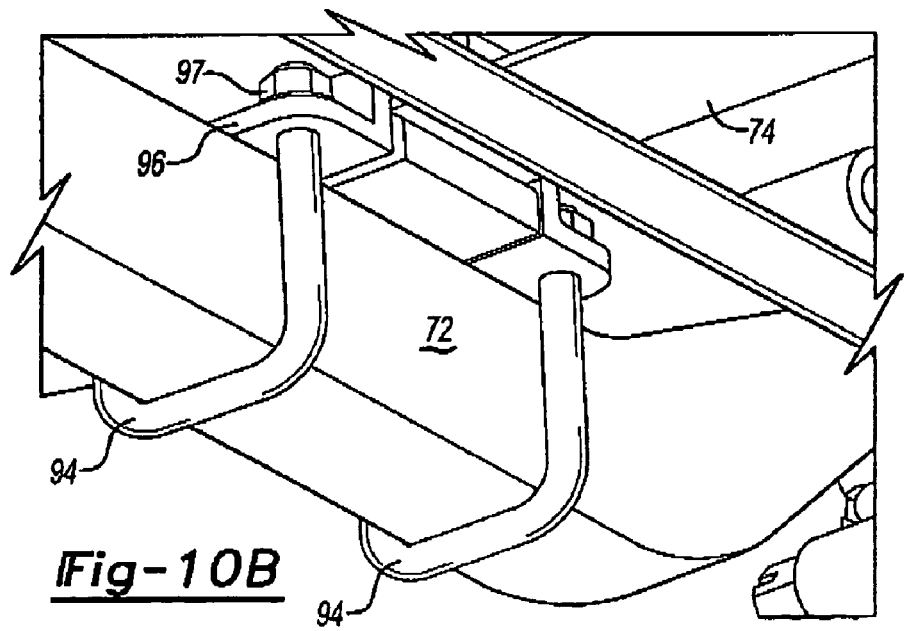
FIG. 10B is a bottom perspective view of the bracket assembly of FIG. 10A.
Figure 11A:
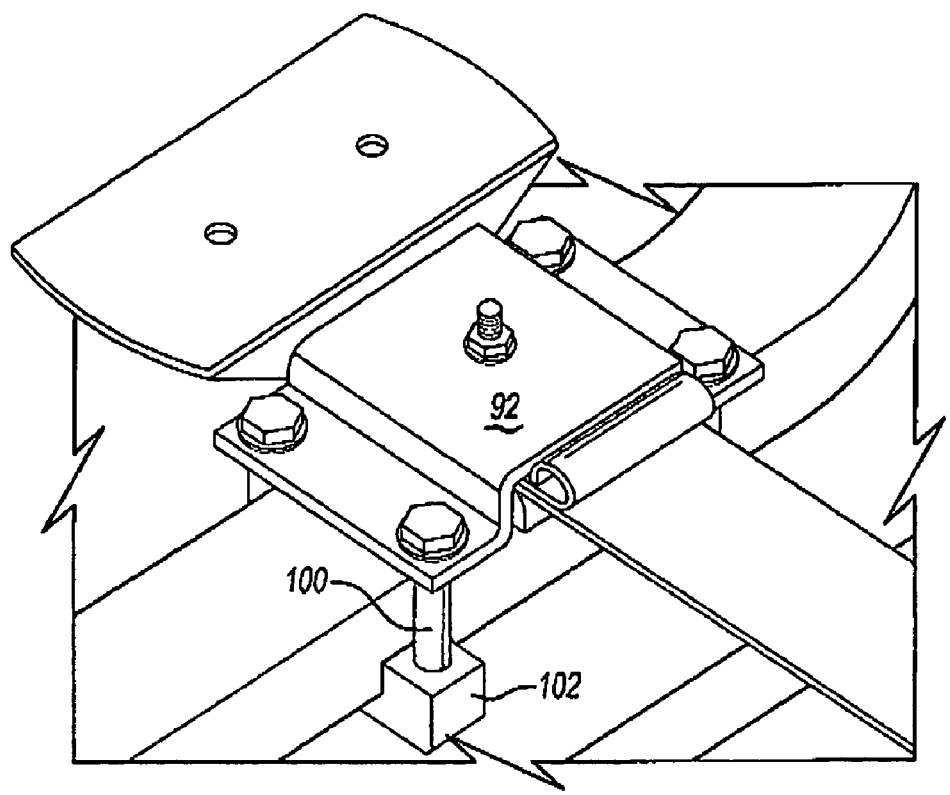
FIG. 11A is a top perspective view of another bracket assembly of the present invention.
Figure 11B:
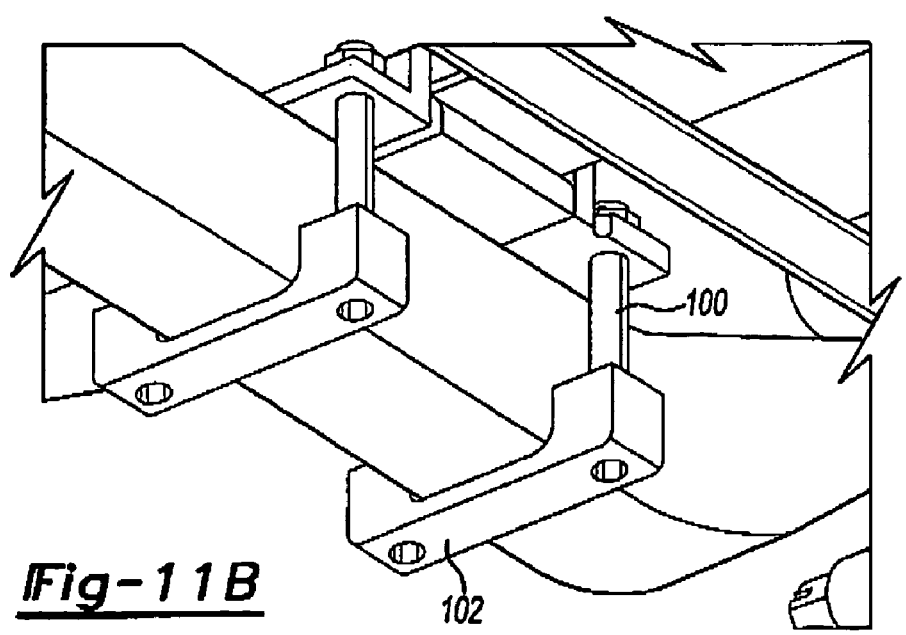
FIG. 11B is a bottom perspective view of the bracket assembly of FIG. 11A.

Referring to FIGS. 11A and 11B, straight bolts 100 and lower clamp plates 102 engage a mounting plate 92 replace the U-bolts of FIGS. 10A and 10B to provide another mounting arrangement.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A bracket assembly for an air spring suspension comprising:
    an air spring seat having an air spring seat area and an extended mount area said air spring seat comprises a stepped plate which defines said air spring seat area and said extended mount area; and
    a fastener mounted to said air spring seat, said fastener at least partially surrounding an axle beam to sandwich a leaf spring between said axle beam and said air spring seat, wherein said air spring seat area and said extended mount area are opposed, said fastener engages a mounting plate which sandwiches said extended mount area between said mounting plate and said leaf spring.

2. The bracket assembly as recited in claim 1, further comprising a rolled end of said extended mount area.

3. The bracket assembly as recited in claim 1, wherein said fastener comprises a U-bolt.

4. The bracket assembly as recited in claim 1, wherein said fastener comprises a straight bolt and bracket.

5. The bracket assembly as recited in claim 1, wherein said air spring seat comprises a U-shaped portion mounted to an air spring plate.

6. The bracket assembly as recited in claim 5, further comprising a mount which extends at least partially within said U-shaped portion.

7. The bracket assembly as recited in claim 6, wherein said mount defines an arcuate groove to receive said fastener.

8. The bracket assembly as recited in claim 7, wherein said U-shaped portion includes a slot which aligns with said arcuate groove.

9. The bracket assembly as recited in claim 5, wherein said U-shaped portion is offset mounted to said air spring plate.

10. The bracket assembly as recited in claim 1, wherein said air spring seat area and said extended mount area are aligned with and located over said leaf spring.

11. The bracket assembly as recited in claim 1, wherein said air spring seat area and said extended mount area are generally parallel to a vehicle longitudinal axis.

12. The bracket assembly as recited in claim 1, wherein said air spring seat area and said extended mount area are located on opposite sides of said axle beam.

13. The bracket assembly as recited in claim 1, wherein said air spring seat area and said extended mount area are formed from a single plate.

14. A bracket assembly for an air spring suspension comprising:

an air spring seat having an air spring seat area and an extended mount area;

a fastener mounted to said air spring seat, said fastener at least partially surrounding an axle beam to sandwich a leaf spring between said axle beam and said air spring seat wherein said air spring seat area and said extended mount area are opposed; and a mounting plate including a U-shaped member with an extended flange, said fastener engageable with said extended flange to sandwich said extended mount area between said U-shaped member and said leaf spring.

15. The bracket assembly as recited in claim 14, wherein said air spring seat comprises a stepped plate which defines said air spring seat area and said extended mount area.

16. The bracket assembly as recited in claim 15, wherein said fastener passes through said extended mount area.

17. An air spring suspension comprising:
a leaf spring;
an axle beam;
a bracket assembly comprising an air spring seat area and an extended mount area;
a fastener mounted to said bracket assembly, said fastener at least partially surrounding said axle beam to sandwich said leaf spring between said axle beam and said bracket assembly, wherein said air spring seat area and said extended mount area are opposed; and
a mounting plate including a U-shaped member with an extended flange, said fastener engageable with said extended flange to sandwich said extended mount area between said U-shaped member and said leaf spring.

18. The air spring suspension as recited in claim 17, further comprising an air spring mounted to said air spring seat area and a longitudinal frame member.

19. The air spring suspension as recited in claim 17, further comprising a shock mounted to a rolled end of said extended mount area and a longitudinal frame member.

20. The air spring suspension as recited in claim 17, wherein said air spring seat area and said extended mount area are located on opposite sides of said axle beam.

21. The air spring suspension as recited in claim 17, wherein said air spring seat area and said extended mount area are generally parallel to a vehicle longitudinal axis.

22. A bracket assembly for an air spring suspension comprising:
an air spring seat including a stepped plate having an air spring seat area and an extended mount area; and
a fastener mounted to said air spring seat, said fastener at least partially surrounding an axle beam to sandwich a leaf spring between said axle beam and said air spring seat, said fastener engages a mounting plate which sandwiches said extended mount area between said mounting plate and said leaf spring.

23. A bracket assembly for an air spring suspension comprising:
an air spring seat having an air spring seat area and an extended mount area; and
a fastener mounted to said air spring seat said fastener at least partially surrounding an axle beam to sandwich a leaf spring between said axle beam and said air spring seat wherein said air spring seat area and said extended mount area are opposed, said air spring seat area and said extended mount extend from opposite sides of a mounting plate, said fastener engageable with said mounting plate.

* * * * *